United States Patent [19]

Susini et al.

[11] Patent Number: 4,776,377
[45] Date of Patent: Oct. 11, 1988

[54] DEVICE FOR LOCKING THE BEADS OF A TIRE

[75] Inventors: Pierre Susini; Philippe Bouchereau, both of Clermont-Ferrand, France

[73] Assignee: Compagnie Generale des Establissements Michelin, France

[21] Appl. No.: 26,009

[22] Filed: Mar. 16, 1987

Related U.S. Application Data

[63] Continuation-in-part of Ser. No. 675,707, Nov. 28, 1984, abandoned.

[30] Foreign Application Priority Data

Dec. 1, 1983 [FR] France .................................. 83 19522

[51] Int. Cl.$^4$ ............................................... B60C 15/02
[52] U.S. Cl. ..................... 152/399; 152/400
[58] Field of Search .................................. 152/399–401, 152/330 RF, 330 L, 388, 158

[56] References Cited

U.S. PATENT DOCUMENTS

| 3,907,018 | 9/1975 | Fujikawa et al. | 152/400 |
| 4,334,565 | 6/1982 | Stokes | 152/158 |
| 4,391,317 | 7/1983 | Savage | 152/330 RF |
| 4,440,209 | 4/1984 | Grob | 152/397 |
| 4,558,728 | 12/1985 | Forneris | 152/400 |

FOREIGN PATENT DOCUMENTS

| 1382994 | 11/1964 | France | 152/330 RF |
| 6507769 | 12/1965 | Netherlands | 152/400 |

Primary Examiner—James B. Marbert
Attorney, Agent, or Firm—Brumbaugh, Graves, Donohue & Raymond

[57] ABSTRACT

A device for locking the beads of a tire against flanges of a multi-piece rim comprises two main parts. The first part having an approximately cylindrical shape is formed essentially of a flexible material. It is strapped by a second part which is nonextensible radially.

5 Claims, 2 Drawing Sheets

DEVICE FOR LOCKING THE BEADS OF A TIRE

CROSS REFERENCE TO RELATED APPLICATION

This application is a continuation-in-part application of U.S. application Ser. No. 675,707, filed Nov. 28, 1984, now abandoned.

BACKGROUND OF THE INVENTION

The present invention relates to a device for locking the beads of a tire against flanges of a multi-piece rim, which device is intended to improve low-pressure travel performance. The multi-piece rim has at least one removable flange or is either a two-part rim or a multiple-sector rim.

For certain travel it is necessary to reduce the inflation pressure of the tires considerably. This is true on soft, marshy or sandy ground. In this case, the beads are insufficiently locked on their seats. There is a danger of the loosening of one or both beads, which suddenly leave the flange of the rim and move axially towards the inside of the rim. In the case of tire/rim assemblies wherein the tire is mounted on the rim without an independent inner tube, this results in a sudden loss of residual pressure and an instantaneous flattening of the tubeless tire. In the case of tire/rim assemblies wherein the tire is mounted on the rim with an inner tube, such displacements of the beads are also intolerable, because they result in rapid deterioration of the inner tube. Mention may also be made of another drawback found in such low-pressure travel, namely the accidental loss of drive due to the turning of the tire on its rim, which may furthermore also lead to a flattening of the tire.

In order to overcome these drawbacks, the idea has been proposed heretofore of mounting on the rim, between the beads, a ring which prevents the beads from moving towards each other. However, in order to be effective such rings must be rigid; in general, they are formed of rubber of very great hardness, possibly reinforced with cores or cables. European patent application No. 0,084,490 describes one such device which is formed of a ring containing a reinforcement. French patent No. 1,173,895 discloses another embodiment of a bead retention ring designed specifically for rims with a removable flange. Such rings must be introduced into the tire between the beads before mounting the assembly on the rim, which is difficult since these rings are heavy, bulky and very inflexible.

SUMMARY OF THE INVENTION

The object of the present invention is to provide a device of annular shape which holds the beads applied against the rim flanges, is very easy to mount without special equipment, can be used with or without an inner tube, does not require any change in the existing dismountable rims, and is compatible with the tires customarily used on these rims.

In accordance with the present invention, the annular device is of very slight rigidity to flexure in its circumferential direction so that it can be easily ovalized in order to favor mounting, while it has very great resistance to flexure in axial direction so as not to deform by buckling under the effect of axial compression and therefore not jeopardize its effectiveness.

The device in accordance with the present invention for locking beads of a tire against flanges of a multi-piece rim comprises (a) a first part having an approximately cylindrical shape with axial ends engageable axially outward against the beads for retention of the beads against the flanges and being formed essentially of a flexible material of a Shore A hardness of less than 85, the first part having a transverse slit, and (b) a second part mountable on the first part which straps the first part onto the rim and which has an axial width when in mounted position less than the maximum axial width of the first part and which has a modulus of elasticity greater than 45,000 mega Pascals, the second part being nonextensible radially.

Any radial expansion of the first part in the central zone thereof is restrained by the radially nonextensible second part.

This difference in the property of the materials used in the first part and in the second part or strap is an essential characteristic of the device of the present invention. The beads can thus be retained on their respective seats by means of the first flexible, deformable part, for example, rubber. The Shore A hardness of this first part is preferably less than 70 and more preferably between 50 and 65. The device remarkably withstands axial force, because buckling is prevented by the second part or strap.

By way of illustration, this second part or strap may be a ring of steel which is thin so that it can be easily introduced into the tire cavity by ovalization, but is nevertheless capable of restraining the flow of the rubber first part.

In accordance with one preferred embodiment of the present invention, the first part has a meridian cross section of U shape. Each axial end which extends radially towards the outside retains one bead of the tire. The second part or strap is arranged between each of these axial ends. This arrangement is particularly advantageous in order to assure accurate and easy centering of the two parts with respect to each other.

DESCRIPTION OF THE DRAWING

The following figures of the drawing show a preferred but nonlimitative embodiment of the present invention.

DETAILED DESCRIPTION OF THE INVENTION

Figure 1:
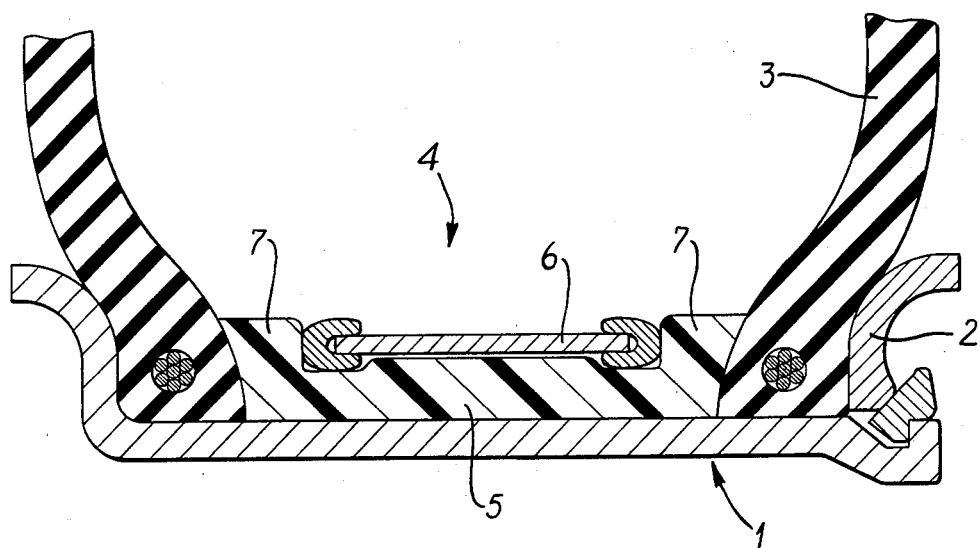
FIG. 1 is a partial view of a meridian cross section through a tire assembly showing a device in accordance with the present invention.
Figure 2:
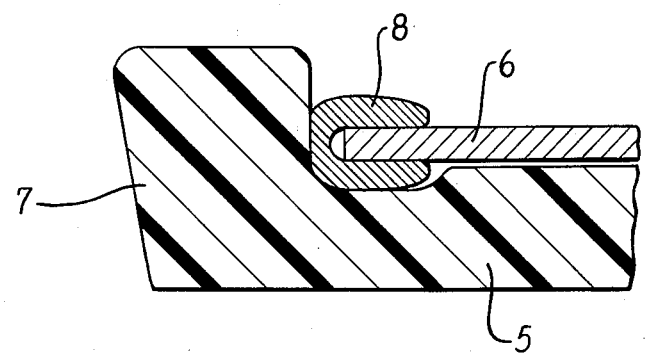
FIG. 2 is a detail view of a meridian cross section through a device in accordance with the present invention.

The tire assembly shown in FIG. 1 comprises a rim 1, one flange 2 of which is removable, a tire 3, and a device 4 according to the present invention for keeping the beads applied against the rim flanges even when travelling with low pressure.

The device 4 comprises a first part 5 of rubber of a Shore A hardness of between 50 and 65 (ASTM Standard D 2240), the meridian cross section of which is of U shape, and a second part or strap 6 which forms a brace between the radially outwardly extending axial ends 7 of the first part 5. The first part 5 preferably occupies the entire space between the rim 1 and the second part or strap 6.

Figure 3:
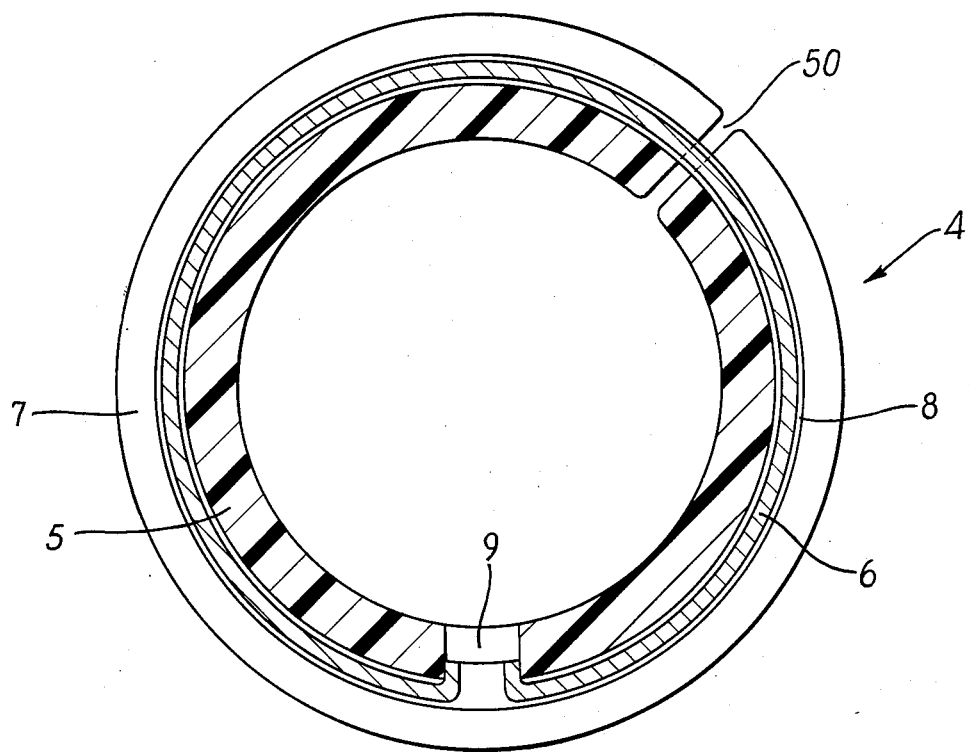
FIG. 3 is a longitudinal cross section through this same device.

The edges of the second part or strap 6 are advantageously provided with a protector 8 so as not to damage the rubber of the first part 5 at its axial ends 7. As to the second part or strap 6, it may be developed in different ways as long as it can contain the radial expansion of the rubber first part 5. In this example, the second part or strap 6 is made of steel, of a modulus of elasticity of 190,000 mega Pascals. The first annular part 5 is slit transversely at 50, as can be noted from FIG. 3. This particular transverse slit arrangement is of great interest, because the rubber first part 5 can be produced in the form of a flat continuous band, which production method lowers the cost for the mold, and then cut to the desired length depending on the size of the tire assembly to be equipped. Due to its flexibility and its slight thickness, this first part 5 can be very easily introduced on the inside of the second part or strap 6 so as to form a ring of rubber.

It is possible to reduce the number of models of the device 4, because the first part 5 does not depend upon the diameter of the tire 3 but rather it depends only on the width of the tire 3. The bead locking device 4 can be easily mounted and dismounted, because it is very easy to put the second part or strap 6 in an oval shape so as to introduce the second part or strap 6 into the cavity of the tire 3 between the beads and then introduce the first part 5 having the transverse slit 50 by putting the first part 5 into a spiral shape in order that the first part 5 would be smaller than the inner diameter of the beads.

In known manner one can, of course, provide the device 4 with a radial hole 9 in order to assure a passageway for the valve of an inner tube, or for the air in the case of an assembly without an inner tube. The inflating of tire assemblies provided with such devices 4 is a problem which is well known in the art and the man skilled in the art can easily employ any known means.

The description which has just been given and the drawing relating thereto illustrate a special bead locking device which gives excellent results.

Different embodiments of the present invention can easily be contemplated, depending on whether one desires maximum efficiency, great ease in mounting or simplified storage. Thus the first part 5 can be divided radially and/or axially and/or circumferentially into several pieces. It may be made of polyurethane. The second part or strap 6 may also be made in several pieces and/or of several materials provided that its modulus of elasticity is greater than 45,000 mega Pascals.

Thus, the second part 6 may be a strap which is held closed by a removable clip or any other removable means in order to be able to store it flat. The strap 6 may also be developed by winding a thin strip in several turns, held wound by any means, for instance one or more hoops. Materials which can be used are aluminum, magnesium, light alloys, glass fibers, aramide and composite materials.

All configurations which, as explained, use two main parts playing different roles and formed essentially of materials having different properties, fall within the scope of the present invention.

What is claimed is:

1. A device for locking beads of a tire against flanges of a multi-piece rim which comprises
   (a) a first part having an approximately cylindrical shape with axial ends engageable axially outward against the beads for retention of the beads against the flanges and being formed essentially of a flexible material of a Shore A hardness of less than 85, the first part having a transverse slit, and
   (b) a second part (mountable on) in assembled condition extending around the first part, which second part straps the first part onto the rim and which has an axial width when in mounted position less than the maximum axial width of the first part and which has a modulus of elasticity greater than 45,000 mega Pascals, the second part being nonextensible radially, whereby in assembling the two parts the firt slit part is inserted within the second part.

2. A device according to claim 1, wherein the first part has a meridian cross section of U shape defining a recess to accommodate the second part.

3. A device according to claim 1, wherein the first part is formed essentially of a flexible material of a Shore A hardness of less than 70.

4. A device according to claim 3, wherein the first part is formed essentially of a flexible material of a Shore A hardness of between 50 and 65.

5. A device according to claim 1, wherein the second part has a modulus of elasticity of 190,000 mega Pascals.

* * * * *

UNITED STATES PATENT AND TRADEMARK OFFICE
CERTIFICATE OF CORRECTION

PATENT NO. : 4,776,377
DATED : October 11, 1988
INVENTOR(S) : Susini et al.

It is certified that error appears in the above-identified patent and that said Letters Patent is hereby corrected as shown below:

First page, Item 73, "Establissements" should read --Etablissements--; Col. 4, line 35, "firt" should read --first--; Col. 4, line 27, delete "(mountable on)".

Signed and Sealed this

Sixth Day of June, 1989

Attest:

DONALD J. QUIGG

*Attesting Officer*  Commissioner of Patents and Trademarks